(12) United States Patent
Kreizinger (10) Patent No.: US 10,294,668 B2
(45) Date of Patent: May 21, 2019

(54) STIFFENED FOAM BACKED COMPOSITE FRAMED STRUCTURE

(71) Applicant: Kenneth R. Kreizinger, Fort Lauderdale, FL (US)

(72) Inventor: Kenneth R. Kreizinger, Fort Lauderdale, FL (US)

( * ) Notice: Subject to any disclaimer, the term of this patent is extended or adjusted under 35 U.S.C. 154(b) by 111 days.

(21) Appl. No.: 15/854,861

(22) Filed: Dec. 27, 2017

(65) Prior Publication Data
US 2018/0187417 A1   Jul. 5, 2018

Related U.S. Application Data

(60) Provisional application No. 62/442,137, filed on Jan. 4, 2017.

(51) Int. Cl.
| | | |
|---|---|---|
| *E04C 2/38* | (2006.01) |
| *E04C 2/284* | (2006.01) |
| *B32B 5/18* | (2006.01) |
| *B32B 27/40* | (2006.01) |
| *B32B 3/30* | (2006.01) |

(52) U.S. Cl.
CPC .................. *E04C 2/38* (2013.01); *B32B 3/30* (2013.01); *B32B 5/18* (2013.01); *B32B 27/40* (2013.01); *E04C 2/284* (2013.01); *B32B 2266/0278* (2013.01); *B32B 2309/105* (2013.01); *B32B 2607/00* (2013.01)

(58) Field of Classification Search
CPC . E04C 2/38; E04C 2/284; E04C 2/205; B32B 3/30; B32B 5/18; B32B 27/40; B32B 2266/0278; B32B 2309/105; B32B 2607/00

USPC ..................... 52/309.1, 309.4, 309.7; 428/71
See application file for complete search history.

(56) References Cited

U.S. PATENT DOCUMENTS

| | | | |
|---|---|---|---|
| 3,258,889 A | 7/1966 | Butcher | |
| 3,641,724 A | 2/1972 | Palmer | |
| 4,471,591 A | 9/1984 | Jamison | |
| 4,748,781 A | 6/1988 | Wencley | |
| 4,856,244 A * | 8/1989 | Clapp ..................... E04C 2/386 |
| | | | 52/220.1 |
| 4,914,883 A | 4/1990 | Wencley | |
| 5,067,296 A * | 11/1991 | Brown .................... E04C 2/386 |
| | | | 52/295 |
| 5,736,221 A | 4/1998 | Hardigg et al. | |
| 5,765,330 A * | 6/1998 | Richard ..................... E04B 1/14 |
| | | | 52/265 |

(Continued)

FOREIGN PATENT DOCUMENTS

AU    WO/2013/052997 A1    4/2013

*Primary Examiner* — Brent W Herring (57) ABSTRACT

A foam backed composite framed structure is substantially stiffened by reconfiguring some of the foam backing from a dropped section, between the frame members, to a continuous section above the frame members. The framed structure is comprised of a foam backed panel, which is a cladding with a foam backing, that is adhesively bonded to frame members. The thicker the continuous section of foam, the stiffer the framed structure. Since the frame is bonded to the cladding by the continuous section of foam, it eliminates the need for nails or other fasteners and thereby eliminates the thermal bridges caused by such fasteners. This results in a stronger structure with increased thermal insulation and fewer frame members.

19 Claims, 8 Drawing Sheets

(56) References Cited

U.S. PATENT DOCUMENTS

| | | | |
|---|---|---|---|
| 6,099,768 A | 8/2000 | Strickland et al. | |
| 7,127,856 B2* | 10/2006 | Hagen, Jr. | E04B 1/7604 |
| | | | 52/309.9 |
| 7,168,216 B2* | 1/2007 | Hagen, Jr. | B29C 44/186 |
| | | | 52/480 |
| 7,574,837 B2* | 8/2009 | Hagen, Jr. | B29C 44/186 |
| | | | 52/404.1 |
| 8,397,465 B2 | 3/2013 | Hansbro et al. | |
| 8,555,584 B2* | 10/2013 | Ciuperca | E04B 1/355 |
| | | | 52/309.12 |
| 8,696,966 B2 | 4/2014 | Smith | |
| 8,925,270 B2 | 1/2015 | Grisolia et al. | |
| 9,255,400 B2 | 2/2016 | Smith | |
| 2008/0313985 A1 | 12/2008 | Duncan | |
| 2011/0047908 A1* | 3/2011 | Brusman | E04C 2/205 |
| | | | 52/220.1 |
| 2012/0011792 A1 | 1/2012 | DeWildt et al. | |
| 2013/0104480 A1* | 5/2013 | Smith | B29C 39/10 |
| | | | 52/309.7 |
| 2014/0115988 A1 | 5/2014 | Sievers et al. | |
| 2014/0115989 A1 | 5/2014 | Sievers et al. | |
| 2014/0115991 A1 | 5/2014 | Sievers et al. | |
| 2014/0174011 A1* | 6/2014 | Smith | B29C 39/10 |
| | | | 52/309.7 |
| 2015/0093535 A1 | 4/2015 | Lambach et al. | |
| 2015/0376898 A1 | 12/2015 | Kreizinger | |
| 2017/0044759 A1 | 2/2017 | Kreizinger | |

* cited by examiner

STIFFENED FOAM BACKED COMPOSITE FRAMED STRUCTURE

CROSS REFERENCE TO RELATED APPLICATIONS

This application claims the benefit of the filing date of U.S. Provisional Application Nos. 62/442,137 filed Jan. 4, 2017 which is incorporated herein by reference.

INVENTION BACKGROUND

The inventive subject matter comprises stiffening framed structures while improving their thermal insulation by rearranging polyurethane foam insulating material. Despite polyurethane foam's low modulus of elasticity, it has been found that partially embedding a frame in an adhesive foam can substantially increases the stiffness and load carrying capacity of framed structures while eliminating thermal bridges and reducing the number of frame members.

There has been a need to strengthen buildings by increasing a framed structure's load capacity at little or no cost for all types of applications. Stronger framed structures result in the ability to carry greater loads and/or increase spacing between frame members which reduces cost. To date, increasing load capacity of frame members and their supported panels has been accomplished by changing the frame member's or panel's design to use materials with an increased modulus of elasticity and/or with an increased moment of inertia and/or by shortening the frame member's span.

There has also been a need to use materials more efficiently in that typical building walls, for example, are comprised of several layers of different materials with each providing a different function to overcome the deficiencies of other materials. This is a waste of materials and labor and there is a need to consolidate wall functions into fewer, more versatile materials that will improve quality, speed construction and save costs. One such material that can do this is self-adhering polyurethane foam.

Spray or poured polyurethane foam has been used in building construction for the past 70 years primarily as an expensive thermal insulating material and many of it's other desirable properties have been overlooked. One unique property is polyurethane foam's ability to be applied as a liquid in ambient temperature and proceed to expand and adhesively bond to anything it comes in contact with during it's expansion. This property enables insulated building panels, for example, to be manufactured by simply positioning a cladding, face down, with a frame about one inch above and then applying the liquid polyurethane foam to the cladding's backside. The foam expands and self-adheres to the cladding and frame resulting in a composite framed structure complete with continuous and cavity insulation, no thermal bridges (nails) and an air, vapor and moisture barrier—all with minimum labor.

Composite action has been widely applied to wall, floor or roof assemblies where increased load capacity and greater structural integrity has been achieved by adequately bonding a sheathing to the frame members. It is also well known that polyurethane foam can be used to bond sheathing or claddings to frame members and thereby reduce racking and increase the structural integrity of an entire structural wall or roof section. However, no prior art has recognized that embedding frame members in self-adhering polyurethane foam can result in substantially increasing a framed structure's lateral/transverse load bearing capacity.

U.S. Pat. No. 3,258,889 (Richard A. Butcher) discloses a structural wall comprised of polyurethane foam bonded to an interior wallboard and to the sides of studs and teaches added stiffness of the framed wall to enable thinner panels and lighter frame members. U.S. Pat. No. 3,641,724 (James Palmer) discloses a wall section comprised of an exterior cover bonded to the sides of stud members by a polyurethane foam that increases the strength of the entire structure. U.S. Pat. No. 4,471,591 (Walter E. Jamison) discloses a wall assembly with an exterior section comprised of polyurethane foam bonded to sheathing and to the sides of studs. U.S. Pat. Nos. 4,748,781 & 4,914,883 (Stanley E. Wencley) discloses polyurethane fillets bonding a panel to frame members to provide an increased strength bonded structure.

U.S. Pat. No. 5,736,221 (James S. Hardigg, et al) discloses two half panels with each having a face and a web molded to the face's backside and the webs bonded together to provide a panel having bending strength in all directions. U.S. Pat. No. 6,099,768 (Michael R. Strickland et al) discloses a frame reinforced with wire mesh and embedded in polyurethane foam that bonds a backer board to the frame. U.S. Pat. No. 8,397,465 (Jeffrey M. Hansbro et al) discloses a wall assembly comprised of polyurethane foam panels bonded to the sides of structural members (studs) and to foam boards continuous over the structural member's edge. U.S. Pat. No. 8,696,966 (Jason Smith) discloses a method of fabricating a wall structure whereby polyurethane foam is applied against a form and the foam expands to become a panel bonded to the edges and sides of support members (studs) within a wall frame. US 2012/0011792 (Dean P. DeWildt et al) discloses a light-framed wall structure comprised of sheathing attached to studs with a top and bottom plate and spray polyurethane foam in the cavity. The wall structure has high axial point, lateral and transverse load bearing properties. WO/2013/052997 (John Damien Digney) discloses a composite panel system reinforced with wire mesh and comprised of a structural cladding spaced apart from and bonded to a studded frame with polyurethane foam that is between and continuous over the studs.

US 2014/0053486 (Anthony Grisolia et al) discloses a wall structure including support members inside the frame (studs) and a polyurethane foam panel both continuous over and between the support members. US 2014/0115988, US 2014/0115989 and US 2014/0115991 (Michael J. Sievers, et al) discloses a wall assembly of a frame assembly with vertical members (studs) and an insulating foam layer disposed between and on top of the vertical members. US 2014/0174011 (Jason Smith) discloses a method of fabricating a wall structure comprised of bonding polyurethane foam to the edge and sides of frame members. US 2015/0093535 (James Lambach et al) discloses a framed panel with a polyiso board continuous over frame members and bonded to the sides of frame members with polyurethane foam. US 2015/0376898 and US 2017/0044759 (Kenneth R. Kreizinger) discloses a frame supported panel having increased load capacity derived from polyurethane foam bonded to a cladding and to frame members.

The problems to be solved by this inventive subject matter are: first, to increase the load carrying capacity of composite framed structures at little or no additional cost. Second, to manufacture stronger structures more efficiently, and third, to increase the thermal insulating value of composite framed structures by eliminating thermal bridges and reducing the number of frame members.

SUMMARY OF INVENTION

The inventive subject matter comprises stiffening framed structures while improving their thermal insulation by rearranging polyurethane foam insulating material. Despite polyurethane foam's low modulus of elasticity, it has been found that properly positioning the foam can substantially increases the stiffness and load carrying capacity of framed structures while eliminating thermal bridges and reducing the number of frame members.

The invention is a frame with an attached cladding stiffened by adhesively bonding foam to the frame and cladding in a fixed/continuous/dropped condition to create a composite framed structure. In applicant's application US20170044759 filed Oct. 28, 2016, a fixed/continuous/dropped condition was disclosed that substantially stiffened a panel that is frame supported. Such a condition was created by combining a panel's continuous section, over the top edges of frame members, with the panel's dropped section adhesively bonded to the frame member's sides. The panel's combined polyurethane foam's continuous and dropped sections, bonded to both frame members and to a cladding, resulted in a foam backed panel having a substantially increased load capacity between frame members. As such, the panel was stiffened.

Subsequent to the filing of the above patent application, additional testing was undertaken with several unexpected results. The first unexpected result was that frame members bonded to a foam backed panel may be substantially stiffened when the panel induces a fixed/continuous/dropped condition on the frame members. It was also expectantly found that the frame members became stiffer as a continuous section, of a fixed/continuous/dropped condition, is thickened while a dropped section becomes thinner by the same amount. This applies to both frame members supporting a wall or roof as well as to smaller ribs supporting a laminated table top, for example. It also applies to different frame member or rib materials.

It was also unexpectedly discovered that steel frame members or ribs will have a greater absolute increase in stiffness compared to wood whereas wood frame members or ribs will have a greater percentage increase in stiffness compared to steel.

It was also unexpectedly discovered that filling a "C" shaped light gauge steel stud with foam will increase the load carrying capacity of that stud.

It was also unexpectedly discovered that ribs may be "suspended", i.e. fully embedded, in self-adhering foam and thereby reinforce the foam to increase the load carrying capacity of the foam and any cladding to which the foam is bonded. Such ribs do not require support from any other member to reinforce the foam.

It was also unexpectedly discovered that such suspended ribs may be used to reinforce a seam between two foam backed panels where the seam is not directly supported by frame members. Such a rib may be inserted into the foam of both panels to bond the panels together as if they were manufactured as one.

From this "suspended" ribs phenomenon it was also unexpectedly discovered that the ribs may serve as embedded anchors for straps used to mechanically connect a foam composite panel to frame members and provide substantial panel uplift resistance. The straps also provide a fast and efficient method of installing foam composite panels to a frame that results in 100% continuous insulation and the total absence of thermal bridges (nails) used in conventional construction.

Other objects, advantages and features of the inventive subject matter will be self evident to those skilled in the art as more thoroughly described below.

DETAILED DESCRIPTION ACCORDING TO THE PREFERRED EMBODIMENTS OF THE PRESENT INVENTION

The inventive subject matter comprises stiffening and improving the thermal insulation of composite framed structures by simply rearranging the polyurethane foam insulating material in the structure. Despite the foam's low modulus of elasticity, it has been found that properly positioned foam can substantially increases the stiffness and load carrying capacity of a composite framed structure, while eliminating thermal bridges and reducing the number of frame members.

A structure's stiffness or load carrying capacity is determined by a load test which is well known is the art and comprises the measurement of a structure's deflection resulting from a uniform distributed load placed on the area of a structure that is over a span. Loads, also known as pressure or forces, can originate from an exterior source such as wind, soil or snow, to apply pressure on the exterior side of the structure causing the load to be inward, toward the interior side of the structure. Loads can also be from a interior sources, such as uplift on a roof, and thereby the load test would place a load on the interior side of the structure for an outward load.

The degree of structure deflection, i.e. bending, is measured for various loads and can be compared to that of another structure over the same defined span as long as there is consistency of the span, load arrangement and other well known variables that can affect deflection and load capacities. Stiffness, as used herein, refers to the ability to carry an increased load over a span. The stiffer a panel, frame member, rib or other structure, the greater it's load capacity relative to deflection.

As used herein, the term load capacity, also known as load carrying capacity, is a structure's maximum load it can carry, or force or pressure it can withstand, over a given span before the structure deflects more than a given amount. Load capacity is recorded in pounds per square feet over an area (width×length) of a spanned structure. The defined span area may include only the area over a "clear span", i.e. between the panel supports creating the span, or it may be a "full span" which includes that portion of the structure directly supported at each end of the span, as long as any comparison load tests use the same spanned area. As the amount of uniform load increases on the structure over the span the structure reacts by bending which is measured by it's deflection.

Due to problems caused by excessive deflection, load capacity is an important element of almost all frame supported panels, regardless of application. In many applications there is a maximum, allowable amount of deflection for a given load. For example framed walls may be required to carry a minimum lateral load of 40 psf (pounds per square foot) without deflecting more than L/240. This means, for example, that a wall section measuring 48 inches×96 inches, with a clear span length "L" of 93 inches (96" minus 1.5" supported on both ends) cannot deflect more than $^{93}/_{240}$ or 0.388 inch when the given 40 psf load is applied. In this case the wall section has a total defined area over a clear span of 31 square feet (48×$^{93}/_{144}$) and therefore must support a total uniform distributed load of 1,240 lbs (31 sf times 40 psf) without deflecting more than 0.388 inches. A panel or other structure is stiffened when it is altered or affected in some way to enable it to carry an increased load and thereby have an increased load capacity.

For clarification purposes, an increased load capacity or a load capacity that is increased is a load capacity that has been increased from some previous amount of load capacity or is greater than the load capacity produced by a different structure configuration. Such a load capacity is increased, or is greater than, by at least 5% or preferably at by least 10% or more preferably by at least 15% and still more preferably by at least 20% and even still more preferably by at least 25% and is most preferable by at least 30%.

A span is the distance between supports and therefore is both a length and a space. For example, when a frame member's ends are supported, the space and length between the ends is a span, which may be a clear or full span as defined above. The term "one or more spans" refers to either a single, undivided space between two supports or to a multitude of spaces separated from each other by multiple spaced apart supports. While it is well known that loads on adjacent spans may affect the load capacity of a span, such a reaction is specifically excluded from this application.

Once the load capacity of any structural configuration over a given span is known from load testing, the load capacity of other identical structural configurations over the same span will also be known as a result and thereby the specific structure's load capacity is established for any purpose. Any change in the structure's configuration or span that is known to increase the structure's stiffness shall also be known to increase the structure's load capacity to some amount greater than the structure's load capacity prior to the change. For example if a composite framed structure has a load capacity of 50 psf over a 96 inch span, it will have at least a 50 psf load capacity over a shorter span. Likewise if a composite framed structure with 1 inch continuous and 1 inch dropped sections of foam over a span and has a 30 psf load capacity the same structure with either or both the continuous section and the dropped section thickened, will have at least a 30 psf load capacity over the same span.

In a preferred embodiment of this inventive subject matter it was discovered that adding a continuous section of foam, to a foam backed panel in a composite framed structure, increases the load carrying capacity of the frame members, and thereby of the structure, in the direction parallel to the frame members. It was also found that increasing the thickness of a continuous section of foam, in a foam backed composite framed structure, while decreasing the dropped section's foam thickness by the same amount, also increases the load carrying capacity of the structure in the direction parallel to the frame members.

Figure 1:
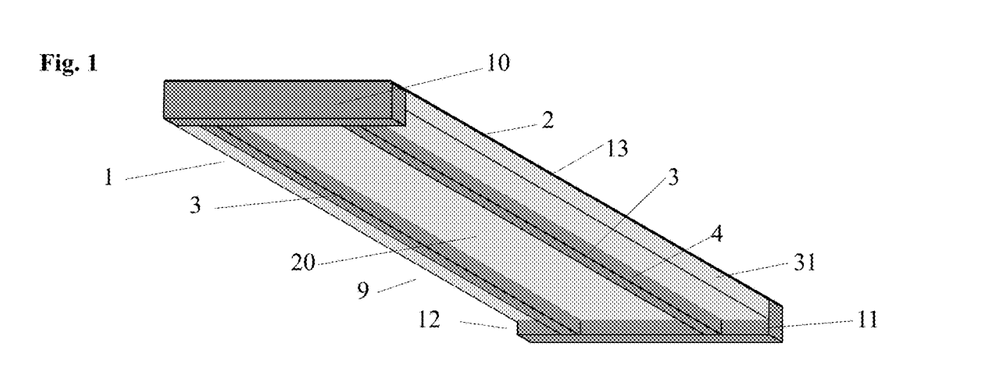
FIG. 1 is a foam backed composite framed structure without a continuous section of foam.

In a series of tests, referred to as "2×4 tests", a 28"×96" foam backed composite framed structure 9 was built comprised of a frame 12 and a foam backed panel 1 as shown in FIG. 1. The frame 12 was comprised of two 93" wood 2×4 frame members 3 spaced at 24" on center, and nailed to a 28" long 2×4 top plate 10 and bottom plate 11 typical of a stud wall. The 28"×96" resulting frame 12 was covered with a panel 1 comprised of 0.10" thick wood sheet as cladding 2 and 3" of two pound density polyurethane foam 20 bonded to the cladding's backside 13 and to the 2×4's sides 4, also as shown in FIG. 1. The structure 9 was horizontally positioned with the cladding face up with wood supports (not shown) placed under both the top plate 10 and the bottom plate 11 to raise the structure 9 and cause the frame members 3 and panel 1 to be unsupported over a 93" clear span. Although not used, a "full" span in this case is 96" and includes the portion of the structure 9 being directly supported by the wood supports at each end.

In a first 2×4 test, the structure's 9 frame members 3 were in direct contact with the cladding's backside 13 and the polyurethane foam 20 was bonded to the backside 13 between frame members 3 and also bonded to the frame member's sides 4. This resulted in the cladding 2 as the only material in the panel's continuous section and all of the polyurethane foam 20 in a dropped section 31 and bonded to the cladding's backside 13 and to the frame member's sides 4. A uniform distributed load (live load) was placed on top of the cladding 2, i.e. on top of panel 1, to cause the structure 9 to deflect over the 93" span until the deflection reached ⅜" which was a predetermined deflection amount based on L/240 (L=span length). At ⅜" deflection the uniform distributed live load was 830 lbs or 46 psf.

A continuous section is that part of a panel that is continuous over and supported by the frame member's top edges. The continuous section may be comprised of one or more materials, typically in layers, that may or may not include foam, and may or may not be bonded or otherwise attached to the top edges. A dropped section is that part of a panel that is located between and adhesively bonded to at least one side of each frame member and is bonded to the panel's continuous section. The dropped section is in the frame "cavity", i.e. the area between frame member's sides, while the continuous section is outside the cavity. A thickened section is the combined thickness of foam in the dropped section with the foam in the continuous section that is directly above the foam in the dropped section. As used herein, the term "bond" shall mean an adhesive bond unless stated otherwise.

Figure 2:
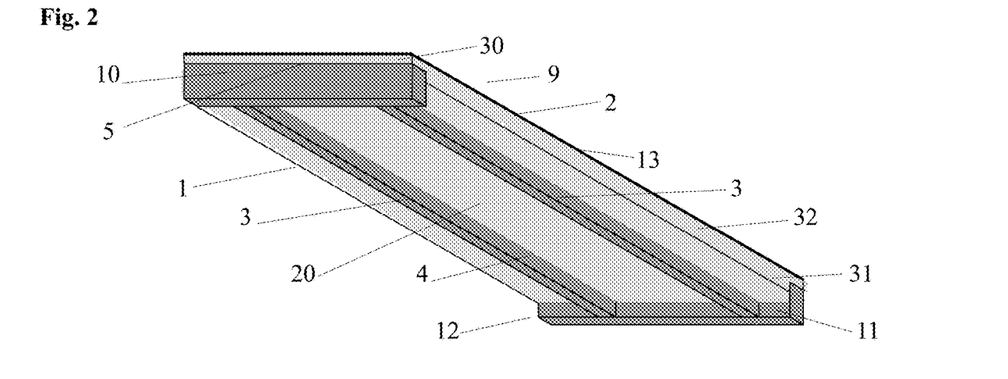
FIG. 2 is FIG. 1 with a continuous section of foam.

A second 2×4 test was conducted by re-positioning the frame 12 0.75" from the cladding's backside 13 with the void filled with the same polyurethane foam to create a 0.75" continuous section 30 of polyurethane foam 20 positioned between and bonded to the cladding's backside 13 and the frame's top edges 5 as shown in FIG. 2. The dropped section 31 was reduced to 2.25" of polyurethane foam 20, to maintain the 3" thickened section 32, and was bonded to frame member's sides 4. In this configuration the structure 9 carried 54 psf over the same 93" span when it deflected the same ⅜" inch. This represented a 17% increase from the 46 psf with no continuous foam section.

A third 2×4 test was conducted by increasing the continuous section's foam to 1.5" and decreasing the dropped section's foam to 1.5" to maintain the 3" thickened section 32 of foam. When this configuration was tested it supported a distributed load of 1,120 lbs or 62 psf at a ⅜" deflection. This is a 35% increase from the 46 psf recorded with no continuous foam section.

From the above 2×4 testing the load capacity of the foam backed composite framed structure increased 17% when a continuous section of foam was inserted without increasing the foam's overall thickness, i.e. the thickened section. Moreover, when the continuous section of foam was thickened even more, while the dropped section of foam was thinned by the same amount, the structure's load capacity increased by 35% over that of a structure having no continuous foam section.

Another set of load tests (1×3 tests) were conducted on a similar foam backed composite framed structure 9, as shown in FIG. 1, with the exception that the frame 12 consisted of 120" long wood 1×3s as studs, i.e. frame members, spaced at 16" on center. The top and bottom plates were 32" long and nailed to the ends of the frame members resulting in a 32"×121.5" frame. Three 32" wide sheets of ⅜" plywood, that combined for a total length of 121.5", were laid over the frame's top edges as cladding and thereby extended 7.6" to the outside of both frame members. The cladding was separated into three sections, as opposed to a single lengthwise sheet over the 121.5" frame, so that any increase in structure 9 stiffness could only be attributed to stiffening frame members. The top and bottom plates were set on blocks to suspend the framed structure over a 120" clear span. The total defined spanned area was thereby 26.67 sf (32"×120"). Load tests were conducted over several different continuous section configurations, using a uniformly distributed load applied over the same 26.67 sf spanned area, until the studs deflected 0.5" (L/240) at the structure's 9 midpoint.

A first 1×3 test was conducted with the cladding in direct contact with the frame's top edges with no mechanical nor adhesive connection between the plywood and the frame and no foam present. In this simply supported configuration the frame members carried a 55 lbs live load and 19 lbs dead load for a total of 74 lbs which equates to 7.4 lbs/lineal foot or 2.8 psf. This is consistent with a calculated load capacity of two simply supported 1×3 frame members having a 1,700.000 psi modulus of elasticity and over a 120" span.

A second 1×3 test added 1⅝" drywall screws, spaced at 9" apart, attaching the plywood cladding to frame members, with no foam present. This mechanically attached configuration carried 221 total lbs or 8.3 psf. A third 1×3 test added 2.5" thick, two pound density polyurethane foam fillets bonded to both sides of both frame members and to the cladding's backside for the entire 120". This created a foam backed composite framed structure with fillets that carried a total of 239 lbs or 9 psf combined live and dead load.

A fourth 1×3 test added a full 2.5" thick layer of the same polyurethane foam for the entire 32"×120" area not covered by the frame members. The foam was bonded to the frame member's sides and to the cladding's backside, although no foam was present between the frame member's top edges and the cladding and the screws remained in place. As such the foam was only in the dropped section between frame members. This foam backed composite framed structure carried 280 lbs live load plus 39 lbs dead load for a total of 319 lbs or 12 psf. This 319 lb load was carried both with and without rotational resistance members, which thereby had no effect.

A fifth 1×3 test was the same as the above fourth test, except the screws were removed so that the cladding was only adhesively bonded to the frame members by the dropped section foam. This configuration carried 216 lbs live load and 39 lbs dead load for 255 total lbs or 9.6 psf and is the same configuration as that shown in FIG. 1. It should be noted that removing the screws from an adhesively bonded panel decreased the load capacity by 2.4 psf, which is much less than the screw's initial impact when they increased the panel's load capacity by 5.5 psf, going from 2.8 to 8.3; sf.

A sixth 1×3 test was conducted similar to the above fifth 1×3 test without screws, except the plywood cladding was separated by 1" from the frame 12 leaving a 1" void between the frame 12 and the panel 1 which was filled with the same polyurethane foam 20 to create a continuous section 30 of foam as shown in FIG. 2. This resulted in a 1" layer of polyurethane foam 20 between and bonded to the top edges 5 and the cladding's backside 13 while the rest of the backside 13 was covered by a 2.5" layer of foam 20. In other words, the newly configured panel 1 comprised a 1" continuous section 30 and a 1.5" dropped section of polyurethane foam 20. When load tested this configuration of a foam backed composite framed structure carried a total of 342 lbs or 12.8 psf.

From the above 1×3 testing the fifth 1×3 test resulted in the structure having a 9.6 psf load capacity without a continuous section of foam. However, when a 1" continuous section of foam was inserted for the sixth test, the same structure with the same 2.5" foam thickness carried 12.8 psf or a 33% increased load capacity, which is comparable to the increased load in the 2×4 tests.

A third set of load tests (steel frame tests) measured the load capacity of a foam backed composite framed structure having 20 gauge steel frame members (studs) over a 117" span. A light steel frame, comprised of two 1.62"×3.5"×10', 20 gauge steel studs spaced at 16", and covered with a ⅜"×32" wide plywood skin cladding. The steel frame members (studs) were screwed to a top and bottom track (plates) to produce a clear span of 118" and the panel's area was 26.2 sf. The structure's dead load was 52 lbs or 2 lbs/sf. The steel studs had a flexural stiffness of 14,732,000 and calculated to carry a load of about 25.9 psf, over the 118" span before deflecting 0.5". Flexural stiffness is herein defined as a material's modulus of elasticity times the materials' moment of inertia which in the case of the above steel studs is $29 \times 10^6$ multiplied by 0.508.

In a first steel frame test, the steel frame was against the plywood and 2.5" of polyurethane foam was bonded to plywood's backside and to the frame member's sides. This configuration carried 857 lbs or 32.7 psf, comprised of 804 lbs live load and 52 lbs dead load. (Note, about 80% of the stud's bottom flange was adhesively bonded to the plywood in that a thin layer of the liquid foam seeped under the studs).

In a second steel frame test, the frame was raised 1" from the plywood such that a 1" continuous layer of foam was inserted between the plywood and the top edges and 1.5" of foam was bonded to the sides, including the inside of the channel shaped stud, for a total foam thickness of 2.5". This structure carried 990 lbs (938 live load) or 37.8 psf, a 46% increase from the calculated load of the studs alone (25.9 psf) and a 16% increase from the same panel with no continuous foam. It is noteworthy that the foam backed composite steel framed structure's load capacity increased by 134 lbs (938-804) for a 17% increase when a 1" continuous section was inserted, whereas the above composite 1×3 wood framed structure's load capacity increased by only 87 lbs (303-216) although for a 40% increase.

In a third steel frame test, beginning with the same configuration of the above second test, the steel stud frame member's channel shape was completely filled with foam the entire 3.5" height. This configured structure carried 1,005 lbs plus 53 lbs dead load for a total of 1,058 lbs or 40.4 psf, a 7% increase from above the above second test.

From the above testing of foam backed composite framed structures it was unexpectedly discovered that: 1. Adding a continuous section of foam increases the load carrying capacity of the structure in the direction parallel to the frame members. 2. Increasing the thickness of a continuous section of foam, while decreasing the dropped section's foam thickness by the same amount, increases the load carrying capacity of the structure in the direction parallel to the frame members. 3. When a continuous section of foam is inserted in a foam backed composite framed structure, it is primarily the frame members which are stiffened, which in turn stiffen the structure to which they are embedded. 4. The ability to increase a foam backed composite framed structure's stiffness is possible with a variety of frame member materials or frame member sizes. And 5. an increase in load carrying capacity from a steel framed structure may be a greater absolute amount although a smaller percentage than the increase in a wood framed structure.

Cladding is herein defined as any panel, material or combination of materials used to provide a cover for a framed structure. Cladding may be of any size and shape and of any material including panels, sheets, boards, panel skins, siding, tiles, bricks, stones, shingles, aggregates, stucco, fiberglass, coatings, film, paint and other materials, including a foam's integral skin if the skin has a modulus of elasticity different than the foam's core. Coatings, film and paint are only considered a cladding if the total dried thickness is greater than 10 mils (0.01"). The cladding may be comprised of a single layer such as plywood or a foam board or may be comprised of multiple layers such as siding nailed to OSB sheathing or a coating or stucco applied to a foam board or laminated panel. The cladding has a face, i.e. front side or exposed side, and a backside that is generally unexposed and may be bonded to another material.

A frame member is herein defined as a structural member connected to other structural members to frame a wall, roof, ceiling, floor or other structure using light frame construction. The framing material may be light gauge metal such as cold rolled steel, hot rolled steel or wood. Frame members are commonly known as studs, joists, rafters, top or bottom truss chords, purlins, top and bottom plates, beams, columns and the like and may be used as framing in any building or other structure. Except for hot rolled steel plates, frame members are at least 1" wide and may have any depth up to 12". For example a typical wood 2×4 has a 1.5" width and a 3.5" depth. Hot rolled steel frame members include thin plates greater than 0.125" (⅛") in thickness (width) and 2.5" in depth. Each frame member has a top and bottom edge on which sheathing or other boards may be attached and two sides along the frame member's length and perpendicular to the top and bottom edges. Frame members also have an end at each end of it's length. Frame members may be connected to one another by any means including foam bonding them together.

A rib is herein defined as a rigid member of any material having a width of less than 1" and a depth of less than 12" except hot rolled steel plates greater than 0.125" (⅛") in thickness (width) and 2.5" in depth. Ribs have the primary purpose of directly stiffening a panel between frame members or other supports in order to withstand deflection caused by a transverse load to the panel such as wind on a wall or snow on a roof. One or more ribs may be used to accomplish this. Ribs may be directly supported by frame members or other supports in which case at least part of the rib is directly above or in front of the frame member's or support's top edge. Suspended ribs are those which are substantially covered by foam and are off to the side of, and separated by foam from, frame members or other supports. Ribs positioned between frame members means that at least part of the rib is located in either the continuous or dropped sections between adjacent frame members. Ribs may be comprised of any rigid material and have a top and bottom edge, which is generally parallel with a cladding supported by the ribs, two sides, which are generally perpendicular to the cladding, and two ends, one at each end of the rib's length.

Rotational resistance members are defined as any element that is attached to the sides or bottom edge of frame members that prevents two or more adjacent frame members from rotating when a load is placed on a panel over a span between the frame members and the panel is bonded to the frame member's top edges.

Structural continuity means that polyurethane foam's structural properties, such as bonding capacity, load carrying capacity, tensile strength, etc., are continuous from the old, or previously applied foam, to the newly applied foam—as though all the foam was applied at the same time, even if there are one or more days between foam application. This assumes the new foam has the same or higher properties than the old foam. Structural continuity may also result in seams, between sections of polyurethane foam, functionally disappearing when filled with the same polyurethane foam. This occurs since newly applied foam attaches to previously applied foam to form an air, vapor, moisture, sound and thermal barrier as if both the new and previous foam were applied at the same time.

Adjacent, spaced apart frame members means that individual frame member's are adjacent to one another although not in contact except in those instances where a frame member's end butts up to another frame member's length such as an end of stud butting up to a bottom plate in a wall frame.

Continuous is herein defined as a state of being continuous over, at least part of, and supported by top edges of two or more spaced apart frame members. Supported by means that a structure bears on or is held up by supports, a frame or frame members and to support a load means to carry or bear a load.

A continuous section of polyurethane foam is herein defined as that part of a polyurethane foam structure that is continuous over and bonded to at least part of two or more frame member's top edges. It is also bonded to and between the cladding and the polyurethane foam's dropped section which is behind or beneath the continuous section, in the cavity created by adjacent frame members. The continuous section ranges in thickness from 0.06 inches to six inches with the increased load capacities beginning to show at 0.25" thick or 0.5" thick and even more so at 0.75" thick, 1" thick and 1.25" thick and even greater at 1.5" thick or two or more inches thick. The polyurethane foam's dropped section ranges in thickness from 0.25" to 10 inches and is bonded to and thereby has structural continuity with the polyurethane foam's continuous section. References to a foam's thickness shall mean the total or combined thickness of the foam in the continuous section, if present, with the foam in the dropped section, if present.

As shown from the above test results, increasing the foam's thickness in the continuous section while decreasing the foam's thickness a like amount in the dropped section can induce an increase in the load carrying capacity of frame members and thereby on a composite framed structure. In addition, thickening the foam in the continuous section without decreasing the thickness of the foam in the dropped section may also increase the load capacity of frame members and the structure to which they are embedded.

In order to measure the increase in load capacity of a composite framed structure caused by the induction of a continuous section of foam, two foam backed composite framed structures must be individually load tested with the results compared. The structures are identical except for the foam placement with the first structure having part of the foam's thickness in the continuous section and part of the foam's thickness in the dropped section. The second structure is reconfigured with all of the foam, i.e. the entire form's thickness, in the dropped section and no foam in the continuous section. Such a load capacity comparison may also be done with a single foam backed composite framed structure by testing it first with only a dropped section of foam and then reconfiguring the structure by separating the cladding from the dropped section of foam and inserting a continuous section of the same foam that bonds to the cladding, the top edges and the dropped section of foam. In order to maintain the foam's total thickness, the dropped section of foam is thinned by the same thickness of the continuous section. Once completed the altered foam backed composite framed structure can be load tested and compared to the same structure, without the continuous section of foam, to determine whether the induction of the continuous section of foam resulted in an increased load capacity.

It is well known that spray or poured polyurethane foam is a self-adhering foam created by a liquid that upon spraying or pouring, herein referred to as "applied", expands and self-adheres to any material it comes in contact with during it's expansion stage—except if the material is expressly treated with a release agent. However, for purposes of this application, polyurethane foam also refers to any foam-like or insulation material, with an R3 or above insulating R value, that begins in some degree of a liquid state, is applied by pouring or spaying and self-adheres to materials it comes in contact with during it's application, whether or not it expands during curing. As such, all polyurethane foam is self-adhered and is thereby considered to be bonded to any structure or material to which it is in contact, attached or connected to including other polyurethane foam, unless stated otherwise. For example a continuous section of polyurethane foam is bonded to a dropped section of polyurethane foam since they are in direct contact with each other, unless specifically stated otherwise.

The polyurethane foam used herein is a closed cell foam with a 1 to 18 pound density and has a thickness ranging from 0.06 inch, when used as an adhesive only, up to a maximum of 12 inches. The polyurethane foam's thicknesses is at least 0.5" and preferably 1" thick and more preferably 1.5" or 2" thick and even more preferably 2.5" or 3" thick and for even more insulation 3.5", or 4" thick and most preferably 5" thick or even 6" thick.

A panel is herein defined as a generally rigid surface, having some amount of flexural stiffness, such as a sheathing that covers a frame or frame members. The panels of this invention may be exterior panels, interior panels or both. The panel's outside surface, i.e. its face, may be flat or shaped and the inside surface, i.e. its backside, may have protrusions or indentations. A panel may be of any material or combination of materials not herein excluded and be of any size. Some examples of panels are: plywood, plastic or other material sheets, sandwich panels, wood or foam boards, siding and roof panels, rib and similar protrusion backed panels, claddings, molded and corrugated or any combination hereof, to name a few. A panel may be a composite panel, which is defined as a panel comprised of two or more different materials bonded together. A foam panel has foam as its sole material and a foam backed panel is comprised of a non-foam cladding with foam bonded to at least half of the cladding's backside. A foam backed panel may also be described as a non-foam cladding with a foam backing, which means the foam backing is bonded to the cladding's backside. In addition, a foam backed panel may have either a continuous section of foam or a dropped section of foam directly bonded to the non-foam cladding. Non-foam is herein defined as any material, whether foam or not, that has a density of greater than 18 lbs.

A foam backed composite framed structure is herein defined as a cladding with a layer of polyurethane foam bonded on the cladding's backside that also bonds the cladding to at least part of the top edges of two or more spaced apart frame members. The frame members may or may not be in contact with each other. The structure also has a dropped section of polyurethane foam between and bonded to the frame member's sides. A foam backed comprise ribbed panel is a foam backed panel with reinforcing ribs at least partially embedded in the foam backing. A foam backed composite framed structure becomes a foam backed composite ribbed panel when the frame members are instead ribs as herein defined.

Figure 3:
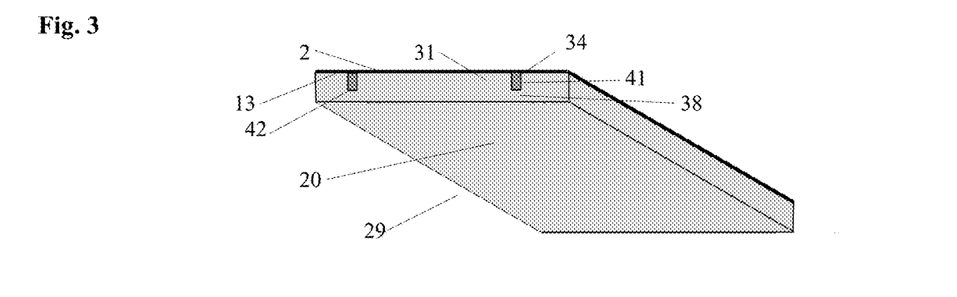
FIG. 3 is a foam backed composite ribbed panel without a continuous section of foam.
Figure 4:
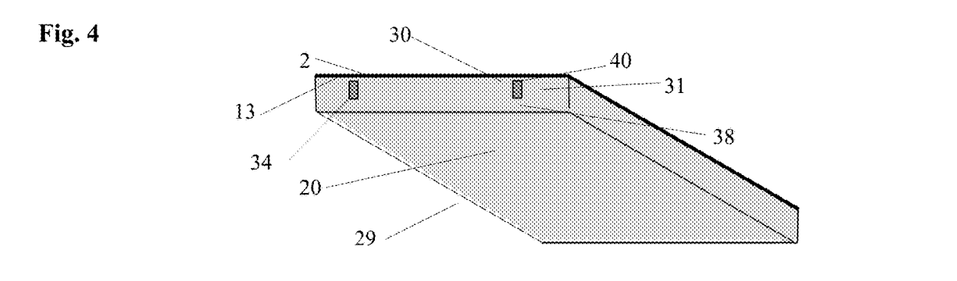
FIG. 4 is FIG. 3 with a continuous section of foam.

In another embodiment it was discovered that the above findings also apply to foam backed composite ribbed panels. Testing was conducted on a 12"×36" foamed backed composite ribbed panel 29 comprised of a 0.10" wood exterior skin as cladding 2 bonded to and continuous over two 0.45"×1.25"×36" wood ribs 34 spaced 8" apart and spanning the full 36" structure length. In the first test, the ribs 34 were in direct contact with the cladding 2 and a 2.4" thick, two pound density polyurethane foam 20 was applied to the cladding's backside 13, the rib's sides 41 and covered the rib's bottom edges 42 such that all of the foam 20 was in a dropped section 31 and bottom section 38 as shown in FIG. 3. When this ribbed panel 29 was load tested with a distributed load over a 33" simply supported span it supported 19 psf at a deflection of 0.14" ($^{33}/_{240}$). In a second test, the same ribs 34 were re-positioned to 0.25" from the backside 13 of the cladding 2 such that there was a 0.25" continuous section 30 of foam 20 over the rib's top edges 40 and the ribs 34 were fully embedded in the remaining 2.15" of foam 20 as shown in FIG. 4. In this configuration the ribbed panel 29 carried a 27 psf distributed load over the 33" clear span when it reached the 0.14" deflection. This represented a 142% increase over the first test that had no continuous foam, although the same 2.4" foam thickness.

In a third test, the ribs 34 were again re-positioned to have a 0.75" continuous section 30 of foam over the rib's top edges 40 and the ribs 34 were fully embedded in the remaining 1.65" foam as shown in FIG. 4. In this configuration the ribbed panel 29 carried 51 psf distributed load over the 33" clear span at 0.14" deflection. In a fourth test, the ribs were re-positioned to have a 1.25" continuous section 30 of foam over their top edges 40 and the ribbed panel 29 carried 88 psf over the 33" span. In this case there was no bottom section 38 of foam since the rib's bottom edges 42 were exposed. In all of these tests the thickened section remained at 2.4" of foam and the dropped section 31 remained at 1.25" or 1.15" of foam whereas the continuous section 30 of foam increased while the bottom section 38 of foam decreased by the same amount.

From the above testing, it is apparent that there is a direct relationship between increasing the thickness of the foam in the continuous section to substantially increase a foam backed composite ribbed panel's stiffness. In these tests the load capacity increased from 19 psf to 88 psf or a 4.6 times increase as the continuous section of foam increased from 0 to 1.25" and the foam's thickness remained constant at 2.4".

In another embodiment it was discovered that ribs may be "suspended" in foam to reinforce both the foam and a foam backed composite ribbed panel. In related tests, it was discovered that ribs embedded in foam need not be directly supported by frame members in order to stiffen a composite panel in which they are embedded. Testing was conducted on several different rib configurations whereby the ribs were embedded in the foam, of a foam backed composite ribbed panel, and positioned between the sides of adjoining frame members and thereby "suspended" in the foam.

Figure 5:
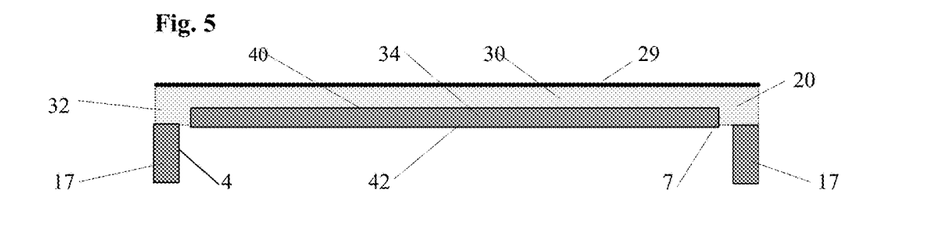
FIG. 5 is a side view of FIG. 4 except the ribs shortened on each end.

In one test, the two ribs in the 12"×36" ribbed panel 29 shown in FIGS. 3 and 4, were shortened by 2" at each end to result in 0.45"×1.25"×32" wood ribs 34. The ribbed panel 29 was placed on and thereby supported by two blocks 17 spaced 33" apart to create a span, as shown in FIG. 5, that was one inch longer than the ribs. The ribs 34 were spaced 8" apart and embedded in a 2.4" thickened section 32 of foam 20 including a 1.25" continuous section 30 of foam above rib's top edges 40 and 0.5" of foam 20 between the rib's ends 7 and the block's sides 4 that supported the ribbed panel 29 at each end. The rib's bottom edge 42 was exposed from the foam 20. As such, the embedded ribs 34 were 0.5" short of reaching the supporting block's sides 4 and thereby may be said to be off to the side of and separated by foam from the blocks 17, herein referred to as ribs "suspended" in the foam.

When load tested, this ribbed panel 20 supported 188 lbs or 68 psf with the "suspended" ribs 34 as compared to 88 psf when the full length, 36" ribs were load tested with the same 1.25" continuous section of foam and only 51 psf for the full length ribs having a 0.75" continuous section of foam. These results demonstrate that while suspending embedded ribs may not provide as much load capacity as directly supported ribs, they do provide a meaningful amount of increased load capacity for a foam backed composite ribbed panel. This is important since the ribs can be separated and recessed from the panel's cladding and supporting frame and thereby result in a thermal break. Without such a separation the ribs form a thermal bridge from the cladding to the frame members.

Additional testing was done with several 12"×24" panels 1 as shown in FIGS. 6 to 9. All panels had a 0.10" wood skin cladding 2 bonded to 3.25" of thickened polyurethane foam 20, which varied in thickness between the continuous section 30 and dropped section 31 for the tests. In all tests the cladding 2 and continuous section's 30 foam 20 extended over half of the top edges 5 of frame members 3, which were 2×4s spaced 24" on center to create a 22.5" clear span 15. The foam 20 was also bonded to the frame member's sides 4 and half the top edge 5. All test panels had rotational resistance members 14 attached to the bottom of the frame members 3 to prevent the frame members from rotating when a load was placed on the panel. The load tests determined the uniform distributed load at a 0.10" deflection over the span 15.

Figure 6:
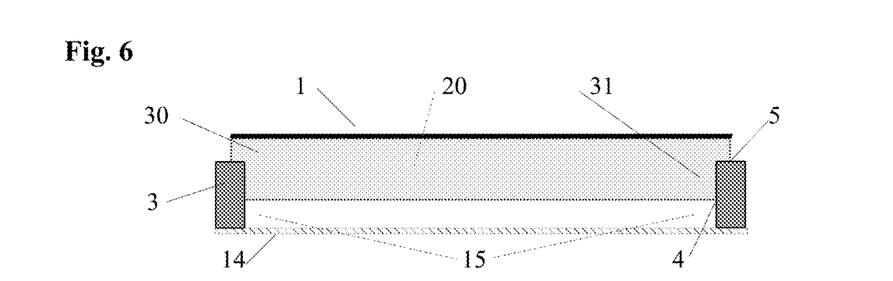
FIG. 6 is a foam backed composite panel with a continuous and dropped sections of foam.

FIG. 6 shows a foam backed composite panel 1 with 1.5" of continuous section 30 of foam 20 and 1.75" of foam 20 in the dropped section 31 and no ribs or other foam 20 reinforcement. This panel carries 267 lbs or 142 psf over the 22.5" span 15.

Figure 7:
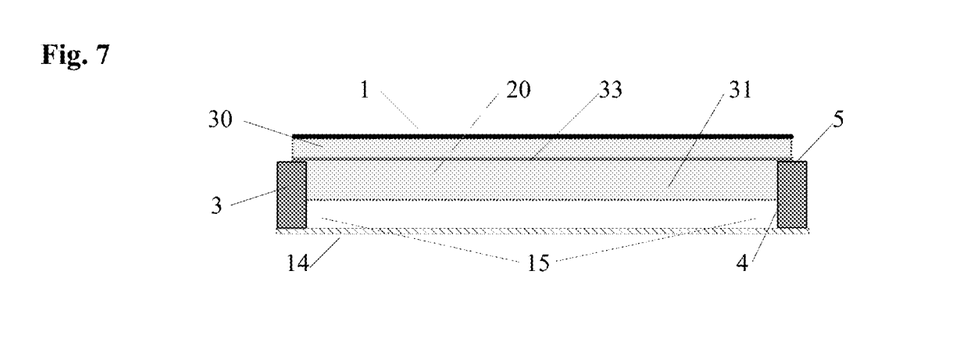
FIG. 7 is FIG. 6 with wire mesh embedded in the foam's continuous section.

FIG. 7 shows the same panel 1 of FIG. 6 except 0.5"×0.5", 19 gauge wire mesh 33 is embedded in the foam's continuous section 30, extending over the frame members top edges 5. The wire mesh 33 is bonded to the frame members 3 and reinforced the foam 20 to such a degree that this panel 1 carried 390 lbs or 208 psf over the 22.5" span 15. This is a 46% increase in load capacity from the same panel 1 with no wire mesh reinforcement, although any type of mesh may be used.

Figure 8:
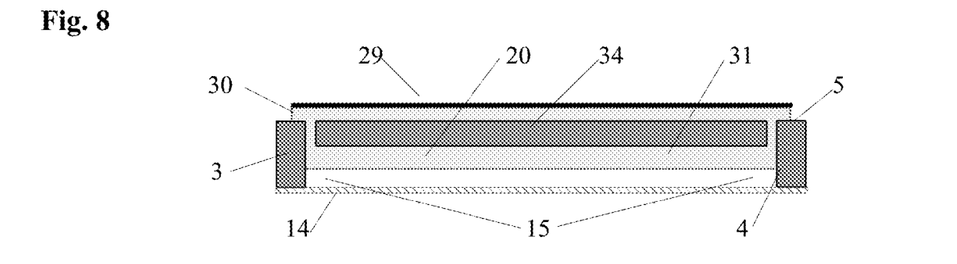
FIG. 8 is FIG. 6 with ribs suspended in a dropped section of foam.

FIG. 8 shows the same panel of FIG. 6 except two 0.45"×1.4"×22.25" wood ribs 34 spaced 8" apart are suspended in a dropped section 31 of the foam 20 with a 0.75" continuous section 30 of foam 20 over the top of the ribs 34 to create a foam backed composite ribbed panel 29. The ribs 34 were 0.25" shorter than the span 15 and were positioned about ⅛" from each frame member's side 4 so that the frame members 3 did not directly support the ribs 34. As a result the ribs 34 were suspended in the foam 20 and effectively reinforced the foam 20 to enable the ribbed panel 1 to carry 410 lbs or 218 psf over the 22.5" span 15. This is a 54% increase in load capacity from the panel 1 with no reinforcement and shows that embedded ribs may be used to reinforce foam.

Another test was done with the FIG. 8 configuration except the continuous section 30 of foam 20 was 1.3" thick over the top of the ribs 34 and the frame member's top edges 5. In this case the ribbed panel 29 carried 498 lbs or 265 psf over the 22.5" span 15. This is consistent with the above findings that the thicker the continuous section, the greater the panel's load capacity.

Another test based on FIG. 8 substituted a 0.45"×2"×22.25" rib for the 1.4" tall rib and covered it with a 0.75" continuous section of foam. In this configuration the 2" tall ribs enabled the foam backed composite ribbed panel to carry 680 lbs or 362 psf. This shows that the greater the embedded ribs' flexural stiffness, the greater the panel's load capacity.

Finally, a 0.06"×1.25"×22.25" steel plate was substituted for the suspended wood rib in FIG. 8 with a 1.5" layer of foam 20 continuous section over the top of the steel ribs 34. In this case the ribbed panel 29 carried 780 lbs or 416 psf due to the steel plate's high flexural stiffness caused by steel's high modulus of elasticity. Since the steel plate's flexural stiffness is much higher than either the 1.4" or the 2" tall wood ribs, the foam backed composite ribbed panel, with steel plate's as ribs, had a much greater load capacity.

Figure 9:
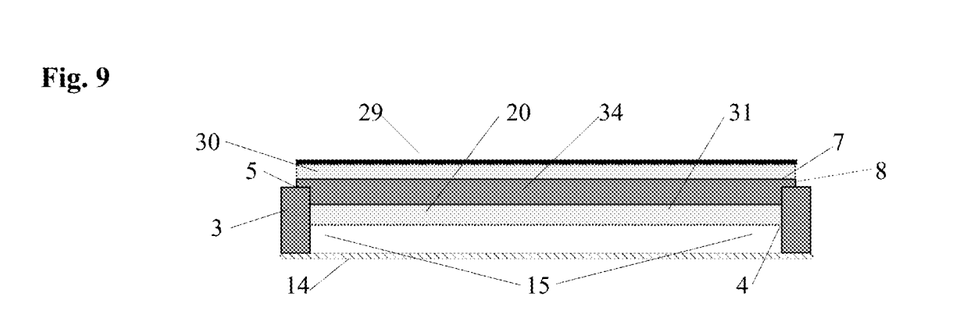
FIG. 9 is a foam backed composite framed structure reinforced with flanged ribs.

FIG. 9 shows the same ribbed panel 29 of FIG. 8 except the two 0.45"×1.4"×22.25" wood ribs 34 have a flange 8 extending from the rib's ends 7 over the frame member's top edges 5. Since the rib's flange 8 is directly above or in front of the frame members 3, the ribs 34 are directly supported by the frame members 3 and resulted in the ribbed panel 29 carrying 476 lbs or 253 psf over the 22.5" span 15. It should be noted that this load capacity is only 16% more than the 410 lb load capacity of the suspended ribs beneath the same 0.75" continuous section.

There were several findings from this testing. First, suspended ribs reinforcing the foam enabled a panel to carry a substantially increased load as compared to a panel without any foam reinforcement, and almost as much load as a directly supported rib embedded panel Second, a foam backed composite ribbed panel's load capacity increased greatly as the rib's flexural stiffness increased as shown where taller ribs and steel straps were used. As such. it is evident that the rib's flexural stiffness greatly affects the rib's ability to stiffen a foam backed composite ribbed panel. Third, consistent with other testing, the thicker the foam in the continuous section the stiffer the ribbed panel. And fourth, wire mesh embedded in foam substantially increased a foam backed panel's load capacity.

In another embodiment a foam backed composite panel was developed having a mechanical connection to frame members, although without thermal bridges such as nails. Such a configuration provides a true 100% continuous insulation. This panel also had a substantial increase in uplift resistance from the simple mechanical connection to frame members.

Figure 10:
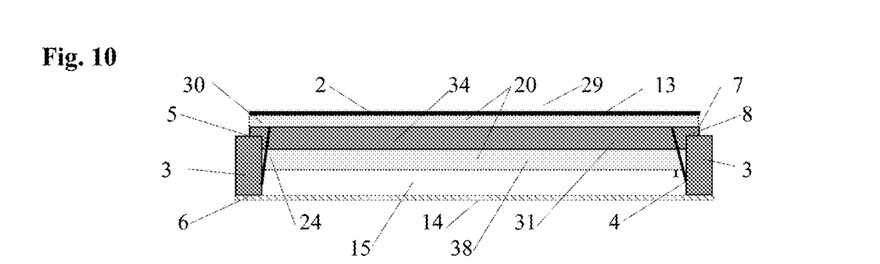
FIG. 10 is FIG. 9 with straps connecting the ribs to the frame members.

In a first test, a foam backed composite ribbed panel comprised of a 0.10"×12"×24" wood cladding 2 with 3.25" of two pound density polyurethane foam 20 bonded to the cladding's backside 13 and two 0.45"×1.4"×24" wood ribs 34 embedded in the foam 20. The ribs 34 each had a 0.5"×1" flange 8 at the ends 7 overlapping the top edges 5 of two 2×4s frame members 3 as shown in FIG. 10. The ribs 34 were thereby directly supported by the frame members 3. The frame members were 20" long and thereby extended 4" beyond the 12" panel 1 width on each side. The polyurethane foam 20 was divided into a 1.5" thick continuous section 30 that extended over half (0.75") of each frame member's top edge 5 and the remaining 1.75" of foam 20 was between the ribs 34 in a dropped section 31 and below the ribs in a bottom section 38. The foam 20 was bonded to the frame members 3 to create a ribbed panel 29 in a foam backed composite framed structure. Rotational resistance members 14 were attached to the support's bottom edges 6 to resist frame member 3 rotation caused by a load placed on the panel 1 over the span 15. The ribs were spaced 8" apart and a 6" long, 10 gauge wire strap 24 was wrapped around both ends of the ribs 34 and stapled to the frame member's sides 4 using 1" pneumatically applied staples. When an inward load was tested to a 0.10" deflection, the frame supported composite panel supported 476 lbs (253 psf) over the 22.5" span.

Figure 11:
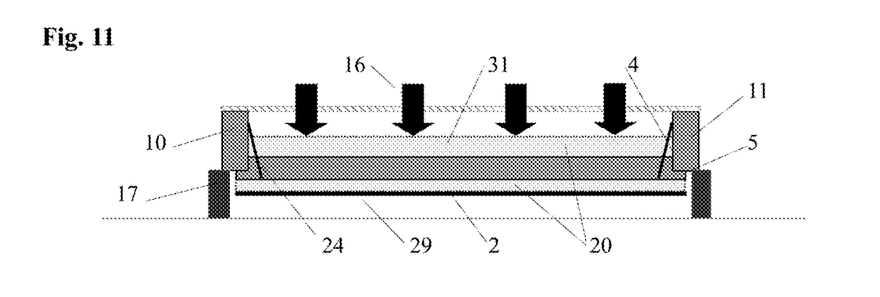
FIG. 11 is FIG. 10 upside down with an outward load to measure uplift resistance.

After inward load testing, the same ribbed panel 29 was subjected to an uplift resistance test conducted by rotating the panel 180 degrees such that the cladding 2 was facing downward and the top edges 5 outside the ribbed panel 29 were supported by blocks 17 resulting in the 12"×24" ribbed panel 29 being suspended above the floor as shown in FIG. 11. A distributed outward load 16 was then placed on the dropped section 31 until the ribbed panel 29 broke away (failure) from the frame members 3, which occurred when the load over the 22.5" span totaled 1,150 lbs or 615 psf. As such, the combination of the foam's adhesive bond to the frame member's top edges 5 and sides 4 and the mechanical connection of the wires straps 24 combined to support a 615 psf uplift resistance, or 154 psf per wire strap connection. Upon inspection, the failure was due to the wire straps slipping through the staples suggesting that the uplift resistance can be much higher with an improved frame member connection.

Therefore, a mechanical connection comprised of one or more straps or similar devices attached to embedded ribs or anchors and connected to frame members is an inexpensive method of providing substantial uplift resistance. This also enables 100% continuous insulation with the absence of thermal bridges since a mechanical connection between the panel and the frame can be accomplished without intruding into the continuous section of foam. Straps are herein defined as elongated strips of any material of any shape that is used to hold or secure objects together.

Figure 12:
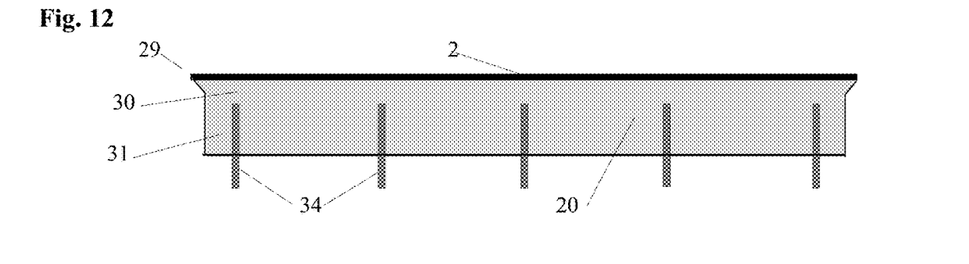
FIG. 12 is a cross section of a foam backed composite ribbed panel with suspended ribs.

In another embodiment, ribs of a foam backed composite ribbed panel facilitated a mechanical connection between two such panels and frame members. FIG. 12 is a cross section of a foam backed composite ribbed panel 29 showing several suspended ribs 34 embedded in polyurethane foam 20 bonding the suspended ribs 34 together and to the cladding 2. Part of the foam 20 is in the continuous section 30 with the cladding 2 and part of the foam 20 is in the dropped section 31 between the suspended ribs 34.

Figure 13:
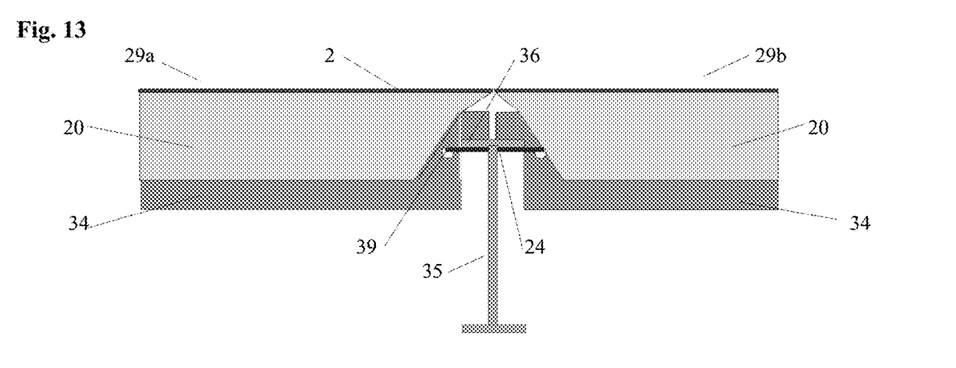
FIG. 13 shows a side view of two panels of FIG. 12 with their ends butting up over a truss.

FIG. 13 shows a side view of two ribbed panels of FIG. 12 whereby the ribbed panels 29a and 29b butt up to one another over a truss 35, which is a frame member in this configuration. The panels 29a and 29b are connected to one another by a direct connection, which in this case is a steel bar strap 24 positioned under the trusses' top cord 36 with 90 degree bent ends inserted through holes 39 in the ends of each rib 34 in panels 29a and 29b. The steel bar strap 24 is secured through the holes 39 by a number of alternative known means and is snug against the bottom of the truss's top chord 36 such that it prevents the ribbed panels from lifting off the truss when subjected to an uplift force.

Figure 14:
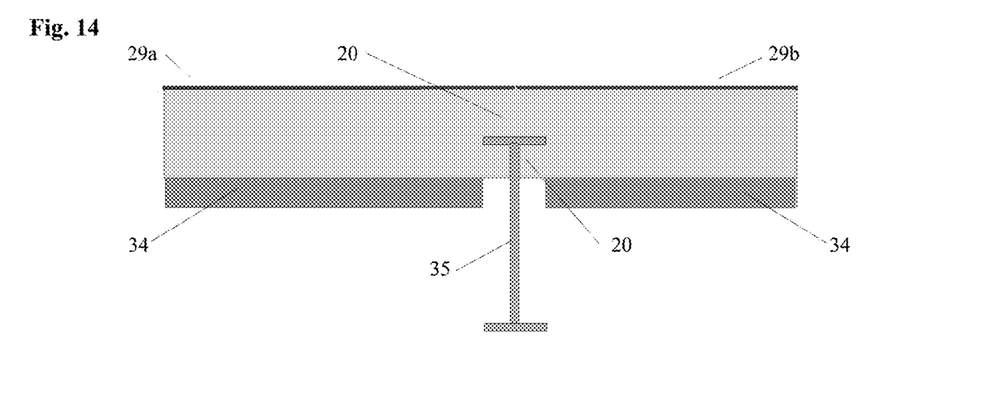
FIG. 14 shows the panels of FIG. 13 fully installed.

FIG. 14 shows the same two ribbed panels 29a and 29b of FIG. 13 fully installed by spray foam 20 applied into the open areas between the two ribbed panels 29a and 29b to bond the panels together and to the truss 35 to form structural continuity as well as seal the seams between the panels.

Figure 15:
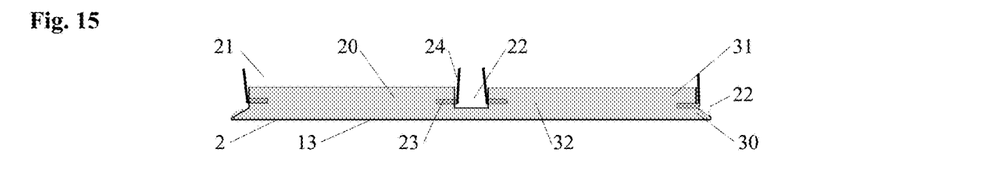
FIG. 15 shows a foam backed composite panel with frame member slots.

In another embodiment, the above described embedded straps can also be used to greatly simplify panel installation. FIG. 15 shows a prefabricated slotted panel 21 comprised of a cladding 2 with 3" of polyurethane foam 20 bonded to the cladding's backside 13 to create a foam backed composite panel. The cladding 2 and part of the foam 20 is a continuous section 30, continuous over the slots 22 with the remaining part of the slotted panel 21 comprised of the dropped section 31 of foam. The panel's area between the slots 22 is the thickened section 32 comprising both the dropped section and continuous sections of foam. The slots 22 are open spaces between the dropped sections 31 and designed for inserting frame members 3 during panel installation. The slots 22 may be full slots 22 as in the center of the panel 1 in FIG. 15 or end slots that will butt up to an adjacent panel (not shown) to form a full slot. Also shown in FIG. 15 are anchors 23 embedded into the foam 20 and adjacent to the slots 22 along with straps 24 attached to the anchors 23 and extending toward and into the slot's 22 open area. Anchors are defined as a rigid material of any size or shape embedded in and bonded to the foam and to which a strap may be attached.

Figure 16:
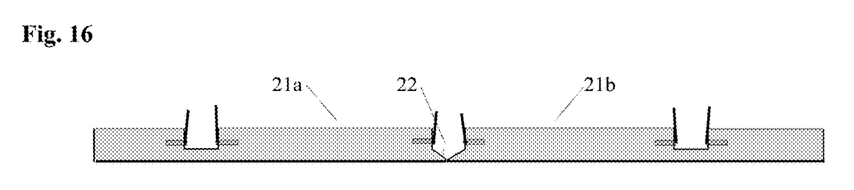
FIG. 16 shows two slotted panels of FIG. 15 butted together forming a center slot.
Figure 17:
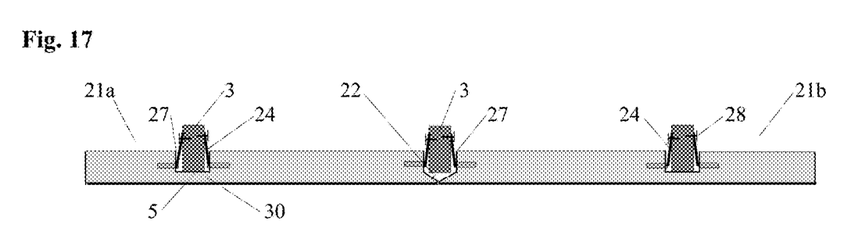
FIG. 17 shows the panels of FIG. 16 with frame members 3 positioned in the slots.

FIG. 16 shows two slotted panels 21a and 21b of FIG. 15 butted together with two half slots combining to form a full slot 22 where they butt together. FIG. 17 shows the panels of FIG. 16 with frame members 3 positioned in the slots 22 although part of the slots 22 remains an open space 27. Spacers (not shown) may be positioned on the frame member's top edges 5 to create a spacing between the panel's continuous section 30 and the top edges 5. FIG. 17 also shows the slotted panels 21a and 21b connected and secured to the frame members 3 by the straps 24 mechanically attached to the frame members 3 with staples 28. One or more straps 24 may be used depending upon the panel's size and/or the desired uplift resistance.

Figure 18:
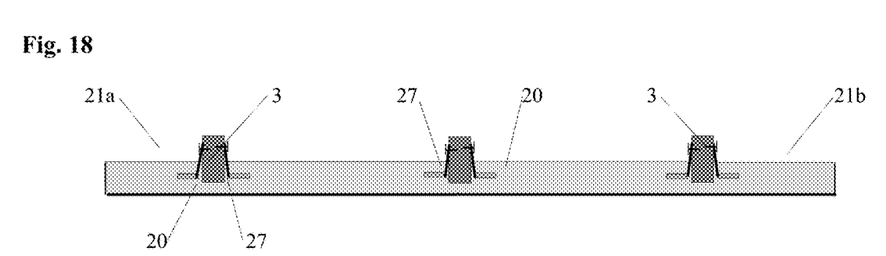
FIG. 18 shows the panels of FIG. 17 with the frame members bonded to the panels.

Once the slotted panels 21a and 21b are secured to the frame members 3, newly added polyurethane foam 20 is used to fill the slot's remaining open space 27 and thereby bond the slotted panels 21a and 21b together and to the frame members 3 as shown in FIG. 18. Since it is known that the newly added foam creates structural continuity with the panel's previously applied foam, this results in a composite panel firmly secured and sealed to a frame as though the frame members 3 were adhesively embedded in the foam during the panels' factory fabrication.

Figure 19:
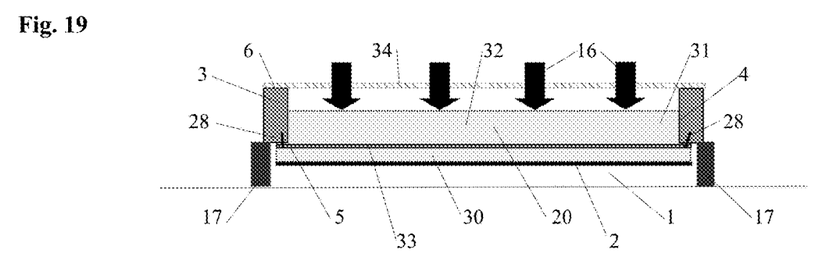
FIG. 19 shows an outward load applied to measure uplift resistance of a foam backed composite framed structure reinforced with embedded mesh.

In another embodiment uplift resistance was substantially increased with mesh embedded into the foam and stapled to the frame members. In a test to measure uplift resistance from an embedded wire mesh, a 12"×24" piece of 0.5"× 0.5"×19 gauge wire mesh 33 was stapled with 1" pneumatic applied staples 28 and bonded to the top edges 5 of two frame members 3 spaced 24" on center. A 1" continuous section of polyurethane foam was bonded to the top edges 5 and to a 0.10"×12"×24" wood cladding 2. The foam's 20 thickened section 32 was 3.25" resulting in a 2.25" dropped section bonded to the sides 4. Two rotational resistance members 34 were attached to the bottom edges 6. The frame members 3 were 20" long so that they extended 4" beyond the panel's 12" width on both sides. This enabled the panel to be suspended from the frame members when turned upside down and the frame member's ends were supported on blocks 17 as shown in FIG. 19.

An uplift resistance test was conducted on the panel by loading the dropped section with a distributed outward load 16 until the suspended panel 1 broke away from the frame members 3 or the wire mesh 33 to represent an uplift force on the panel. At 1,155 lbs or 615 psf, the panel 1 broke away from the frame members 3 when the wire mesh 33 broke from the staples 28.

As a result a mesh embedded in polyurethane foam may be used to provide a mechanical bond between a foam backed composite panel and frame members, while simultaneously stiffening the panel to carry a greater uplift resistance and providing penetration resistance. All this can be accomplished with the mesh and frame members set back from the cladding so that a continuous layer of polyurethane foam can provide seamless, thermal bridge free continuous insulation around an entire structure.

In another embodiment it was discovered that ribs embedded in a polyurethane foam seam will reinforce the seam of a foamed backed composite panel to such a degree that the seam does not have to be over and directly supported by frame members. Typically when frames are used to support panels, any seam between two adjacent panels must be directly on a frame member such that the frame member directly supports both panels. However, it has been discovered that foam backed composite panels may be joined at a seam located anywhere in the span between adjacent frame members.

Since it is known that a later applied foam to fill a seam between two previously applied foams create structural continuity, and that embedded, suspended ribs reinforce foam, seams may be reinforced with suspended ribs. This is accomplished by placing an elongated rib into a cut out foamed area of two adjacent foam backed panels such that the rib stretches across a seam between the two panels. Polyurethane foam is then applied to the existing panel foam and rib to bond the rib to the existing foam and fill the cut out area and seam. This results in a foam embedded rib bonding two panels together in structural continuity while reinforcing both the new foam and the panel's foam as if they are one. The rib may be either touching or spaced a distance away from the cladding's backside.

Figure 20:
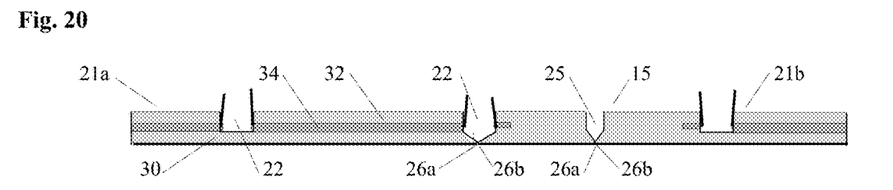
FIG. 20 is a section view of two adjoining slotted panels butted together at a staggered seam.
Figure 21:
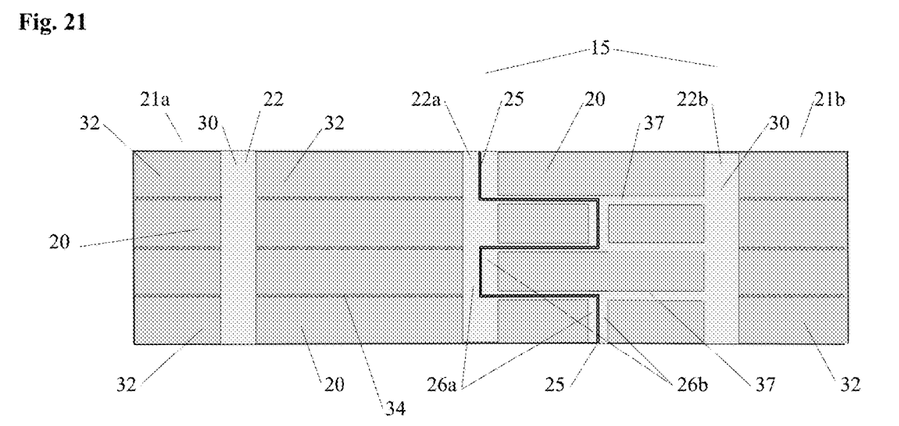
FIG. 21 is a plan view showing the backside of FIG. 20 butted together at the staggered seam.
Figure 22:
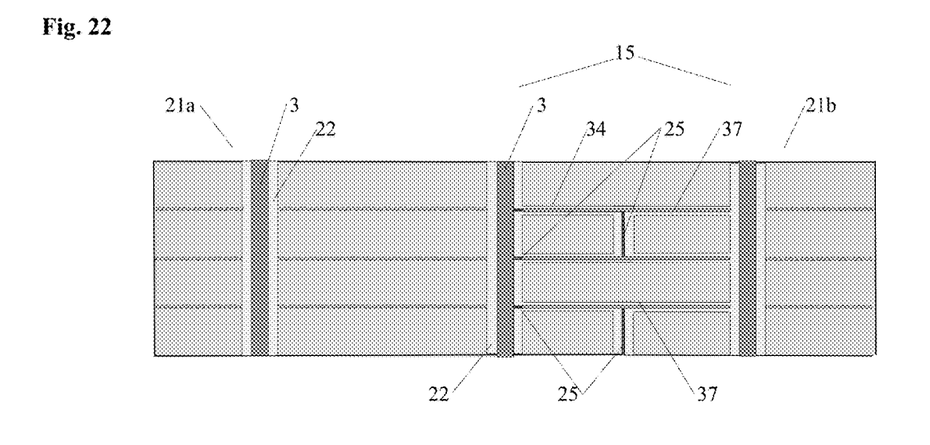
FIG. 22 shows FIG. 21 with frame members positioned in the slots.

FIGS. 20 through 23 shows two staggered seam panels in various stages of being bonded together. FIG. 20 is a section view of two adjoining slotted panels 21a and 21b reinforced with suspended ribs 34 embedded in the panels' thickened sections 32 with the continuous section 30 foam 20 forming slots 22 and seams 25. In some cases the seam 25 between two adjacent slotted panels 21a and 21b may be in a slot 22 into which a frame member is positioned. In other cases the seams 25 may be where adjacent panel's side edges 26a and 26b are in a staggered pattern, such as staggered shingles, as shown in FIG. 21. FIG. 21 shows the backside of the two panels 21a and 21b in FIG. 20 and in particular shows the staggered sides edges 26a and 26b come together both over a slot 22a and over a span 15 between slots 22a and 22b. FIG. 21 also shows foam cutout areas 37 that cross into each panel 21a and 21b over the span 15. These cutout areas 37 are for inserting ribs to reinforce the seam 25 over the span 15 as shown in FIG. 22.

FIG. 22 shows FIG. 21 with frame members 3 positioned in the slots 22 and the center frame member 3 over part of a staggered seam with the remaining staggered seam 25 in the span 15 area. Ribs 34 are positioned in the cutout areas 37 that transition into the part of the seam 25 that is perpendicular to the frame members such that the ribs extend across the seam and over the span 15 from frame member 3 to frame member 3. The ribs are then embedded in foam used to fill and seal the cutout area 37 and seam 25.

Figure 23:
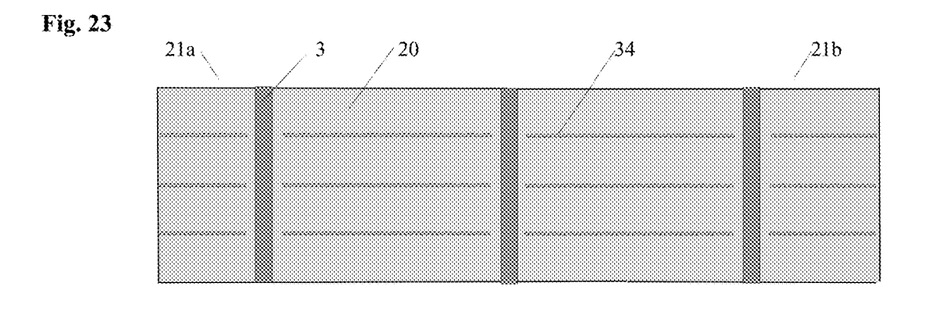
FIG. 23 shows FIG. 22 with the slots, seams and cut-out areas filled with polyurethane foam.

FIG. 23 shows FIG. 22 after the slots, seams and cut-out areas have been filled with polyurethane foam 20 to bond the two slotted panels 21a and 21b together and to the frame members 3. This also embeds the ribs 34 into the foam to reinforce the panel over the seams in the span area. This same process can be used without ribs with foam applied into the slots and seams to bond everything together and cause separate, adjacent panels to become one.

From the description above, a number of advantages of some embodiments of the stiffened, composite framed structure become evident:

(a) The inventive subject matter enables frame members and ribs bonded to a foam backed panel may also be substantially stiffened when the panel induces a fixed/continuous/dropped condition on the frame members.

(b) Frame members and ribs became stiffer as a continuous section, of a fixed/continuous/dropped condition, is thickened while a dropped section becomes thinner by the same amount.

(c) Steel frame members or ribs will have a greater absolute increase in stiffness whereas wood whereas wood frame members or ribs will have a greater percentage increase in stiffness.

(d) Filling a channel shaped light gauge steel stud with foam will increase the load carrying capacity of that stud.

(e) Ribs may be "suspended", i.e. fully embedded, in self-adhering foam and thereby reinforce the foam to increase the load carrying capacity of the foam and any cladding to which the foam is bonded.

(f) Suspended ribs may reinforce a seam between two foam backed panels where the seam is not directly supported by frame members.

(g) Suspended ribs may serve as embedded anchors for straps used to mechanically connect a foam composite panel to frame members and provide panel uplift resistance of several hundred pounds per square foot (psf).

Although the description above contains many specifications, these should not be construed as limiting the scope of the embodiments but as merely providing illustrations of some of several embodiments. Thus the scope of the embodiments should be determined by the appended claims and their legal equivalents, rather than by the examples given.

I claim:

1. A stiffened foam backed composite framed structure comprised of
   a. two or more adjacent and spaced apart frame members with each having a top edge, bottom edge, two sides and a length with two ends and each said length is supported at said ends to create a span between said ends and
   b. a foam backed panel comprised of a cladding continuous over said top edges with polyurethane foam backing and
   c. said foam positioned in a dropped section between and bonded to at least one said side of each said frame member and said foam has a thickness of one inch or more and said composite framed structure has a load capacity as determined by a load test over said span and
   d. at least a 0.25 inch thick continuous section of said foam inserted between and bonded to said cladding and said dropped section, and said continuous section continuous over and bonded to said top edges, and said dropped section thinned by the same thickness of said continuous section to maintain the same said foam thickness, and the induction of said continuous section increases said load capacity of said composite framed structure by at least 10%,
   whereby said composite framed structure is stiffened.

2. The composite framed structure of claim 1 wherein said frame members are ribs to create a foam backed composite ribbed panel.

3. The composite framed structure of claim 1 wherein one or more ribs are embedded in said foam and directly supported by said frame members.

4. The composite framed structure of claim 3 wherein one or more straps secure said ribs to said frame members.

5. The composite framed structure of claim 1 wherein one or more ribs are suspended in said foam between said frame members.

6. The composite framed structure of claim 5 wherein said ribs are positioned over a seam between two said foam backed panels.

7. The composite framed structure of claim 5 wherein one or more straps secure said ribs to said frame members.

8. The composite framed structure of claim 1 wherein one or more anchors are embedded in said foam and at least one strap connects each said anchor to said frame members.

9. The composite framed structure of claim 1 wherein mesh is embedded in said foam and bonded to said frame members.

10. A stiffened foam backed composite framed structure comprised of
    a. two or more adjacent and spaced apart frame members with each having a top edge, bottom edge, two sides and a length with two ends and each said length is supported at said ends to create a span between said ends and
    b. a foam backed panel comprised of a continuous cladding backed by at least a 0.25 inches thick continuous section of polyurethane foam continuous over and bonded to said top edges and a dropped section of said foam positioned between and bonded to at least one said side of each said frame member and said foam has a thickness of one inch or more and
    c. said continuous section of said foam causes said structure to have a load capacity, as determined by a load test over said span, at least 10% greater than said load capacity of said structure reconfigured without said continuous section of foam and all of said foam thickness positioned in said dropped section,
    whereby said continuous section stiffens said composite framed structure.

11. A stiffened foam backed composite framed structure comprised of
    a. two or more adjacent and spaced apart frame members having a top edge, bottom edge, two sides and a length with two ends and said ends are supported to create a span between said ends and
    b. a foam backed panel comprised of a continuous cladding continuous over said top edges and a dropped section of polyurethane foam positioned between and bonded to at least one said side of each said frame member and said foam has a thickness of one inch or more and
    c. said composite framed structure has a load capacity as determined by a load test over said span and
    d. the improvement comprising reconfiguring said foam thickness such that at least 0.25 inch thick is a continuous section of foam, continuous over and bonded to said top edges and to said cladding's backside, and the remainder of said foam thickness in said dropped section, and said reconfiguration increases said load capacity by at least 10%,
    whereby said composite framed structure is stiffened.

12. The composite framed structure of claim 11 wherein said frame members are ribs to create a foam backed composite ribbed panel.

13. The composite framed structure of claim 11 wherein one or more ribs are embedded in said foam and directly supported by said frame members.

14. The composite framed structure of claim 13 wherein one or more straps secure said ribs to said frame members.

15. The composite framed structure of claim 11 wherein one or more ribs are suspended in said foam between said frame members.

16. The composite framed structure of claim 15 wherein said ribs are positioned over a seam between two said foam backed panels.

17. The composite framed structure of claim 15 wherein one or more straps secure said ribs to said frame members.

18. The composite framed structure of claim 11 wherein one or more anchors are embedded in said foam and at least one strap connects each said anchor to said frame members.

19. The composite framed structure of claim 11 wherein mesh is embedded in said foam and bonded to said frame members.

* * * * *